United States Patent
Shiraki

[19]
[11] Patent Number: 5,952,563
[45] Date of Patent: Sep. 14, 1999

[54] DYNAMIC THRESHOLD MARGIN TO TEST MEMORY STORAGE MEDIA

[75] Inventor: Daryl Minoru Shiraki, San Jose, Calif.

[73] Assignee: Komag, Incorporated, San Jose, Calif.

[21] Appl. No.: 09/041,888

[22] Filed: Mar. 12, 1998

Related U.S. Application Data

[60] Provisional application No. 60/051,107, Jun. 27, 1997.
[51] Int. Cl.$^6$ ................................................. G01B 7/34
[52] U.S. Cl. .............................................. 73/105; 324/210
[58] Field of Search ................................ 73/105; 324/210

[56] References Cited

U.S. PATENT DOCUMENTS

5,488,857  2/1996  Homma et al. ............................ 73/105
5,792,947  8/1998  Pogrebinsky et al. .................... 73/105

*Primary Examiner*—Daniel S. Larkin
*Attorney, Agent, or Firm*—Skjerven, Morrill, MacPherson, Franklin & Friel LLP; Michael J. Halbert

[57] ABSTRACT

A memory media tester uses a dynamic threshold margin between the sensor signal produced by a sensor and a threshold level. The dynamic threshold margin is generated as a function of a DC signal generated by converting the sensor signal to a DC voltage, where the sensor signal is composed of a noise level and signal spikes. The rate of change of the DC converted signal is controlled in order to prevent the DC converted signal from being significantly affected by the signal spikes. The dynamic threshold margin may be produced as a dynamic threshold level, a dynamically amplified output signal, or both. The sensitivity of the dynamic threshold margin may be electronically adjusted. The dynamic threshold margin automatically adjusts to changes in the DC converted signal, such as when there is a change in the surface roughness of the media, or when the sensor loses sensitivity. The sensor signal may then be compared to the threshold level, where the difference between the threshold level and the noise level is the dynamic threshold margin. A defect is found when the sensor signal exceeds the threshold signal.

25 Claims, 11 Drawing Sheets

Key to FIG. 10

| FIG. 10A | FIG. 10B |
|----------|----------|
|          | FIG. 10C |

FIG. 11

DYNAMIC THRESHOLD MARGIN TO TEST MEMORY STORAGE MEDIA

CROSS-REFERENCE TO RELATED APPLICATION

The present application claims the benefit of U.S. Provisional Application Ser. No. 60/051,107, filed on Jun. 27, 1997.

FIELD OF THE INVENTION

This invention relates to testing memory storage media for defects. Specifically, this invention relates to the generation of a dynamic threshold margin between a threshold level and an output signal produced by a testing mechanism in order to test memory disks.

BACKGROUND OF THE INVENTION

Memory storage media, such as magnetic memory disks and magneto-optic memory disks, are typically used in a computer's hard disk drive. In the hard disk drive, a memory disk is mounted on a spindle and rotated by a motor at high speed. A read/write head flies at a low height over the memory disk, e.g., approximately one microinch ($\mu''$), on an air bearing created by the high speed rotation of the memory disk. Because of the low fly height of the read/write head, it is important to ensure that the surface of the memory disk does not have any defects, such as asperities, that may contact the read/write head during use. Unintentional contact between the read/write head and a defect may damage the read/write head or the memory disk which may result in a hard drive crash.

A memory disk may be tested for defects with a testing mechanism, such as a glide head, an optical scanner, or an acoustic emissions sensor. A glide head, for instance, flies over the surface of the memory disk at a height that is slightly lower than the height at which the read/write head will fly. By lowering the fly height of the glide head, the sensitivity of the glide test may be increased. However, reducing the fly height creates complications because of the reduced distance between the glide head and the surface of the disk. Mounted on the glide head is a transducer, such as a piezoelectric crystal, that produces an electrical output signal in response to motion of the glide head. The output signal of a glide head comprises two components: (1) a noise signal corresponding to the surface roughness of the memory disk, and (2) a signal spike corresponding to the glide head contacting a defect on the surface of the memory disk. The output signal produced by the glide head is transmitted to a glide tester where it is amplified and compared to a fixed threshold level. The glide tester indicates that there is a defect whenever the output signal exceeds the fixed threshold level.

There are other methods of testing memory disks using a fixed threshold level. For instance, an optical scanner generates an output signal by focusing light on the surface of a memory disk and analyzing the reflected or scattered light. The output signal from the optical scanner is then compared to a fixed threshold level in order to determine if any unacceptably large defects exist on the surface of the disk.

Similarly, an acoustic emissions sensor provides an output signal that is compared to a fixed threshold level while testing a memory disk. The acoustic emissions sensor produces an output signal in response to sensing acoustic vibrations from a head flying over the surface of the memory disk. A defect produces a larger amplitude vibration in the head and, consequently, a larger amplitude output signal from the acoustic emissions sensor. The output signal of the acoustic emissions sensor may then be compared to a fixed threshold level.

The industry practice for generating a fixed threshold level is by calibrating the testing sensor prior to testing memory disks. Calibration is performed with a calibration bump disk having at least one bump of known size. Using a calibration bump of the known size allows the output signal of the testing sensor to be normalized. In one calibration method, the threshold level is set using the signal spike generated by the calibration bump. In a second calibration method, instead of adjusting the threshold level, one adjusts the gain used to amplify the output signal until the signal spike generated by the calibration bump is at the target threshold level. Thus, in one method, the gain used to amplify the output signal is held constant, while the threshold level is adjusted to the fixed level; and in the other method, the threshold level is held constant, while the gain used to amplify the output signal is adjusted to a fixed level. In both methods, however, after calibration, the threshold level and the gain of the output signal will remain at their respective fixed levels. The use of either method will be hereinafter referred to as using a "fixed threshold level." Once a fixed threshold level is set, the testing sensor may be used to test memory disks for defects.

Figure 1:
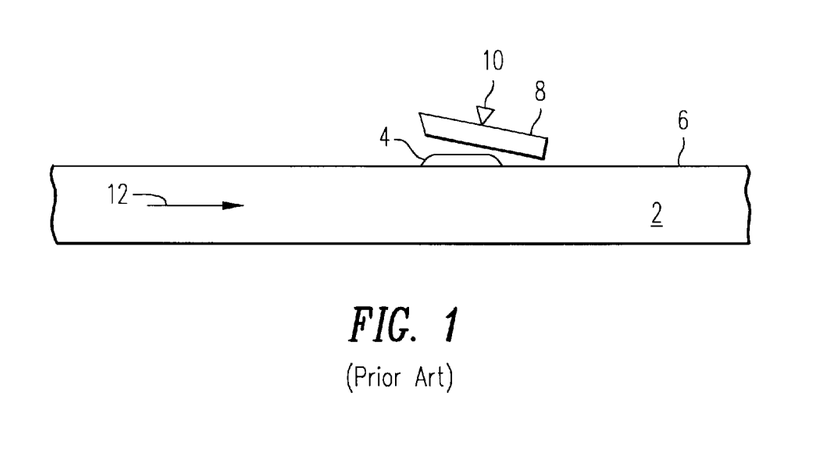
FIG. 1 illustrates a glide head flying over a segment of a rotating bump disk.

As shown in FIG. 1, a calibration bump disk 2 has a bump 4 which has a fixed size and is at a known location on the surface 6 of disk 2. The height of bump 4 on calibration bump disk 2 may vary in accordance with the glide height of the disks to be tested, which is generally about 1.0 $\mu''$ high. Further, the width of bump 4 and the number of bumps may vary depending on the type of bump disk being used. During calibration, a glide head 8 is suspended over bump disk 2 by a suspension arm 10. Of course, if another type of testing sensor was being calibrated with bump disk 2, glide head 8 would be replaced by that sensor. The high speed rotation of bump disk 2, as indicated by arrow 12, generates an air bearing over surface 6 on which glide head 8 flies. A piezoelectric crystal (not shown), mounted on glide head 8, produces an electrical output signal in response to any motion of glide head 8. The output signal is transmitted to a glide tester (not shown), which amplifies the output signal.

When glide head 8 contacts bump 4, the piezoelectric crystal produces an output signal in the form of a signal spike which is transmitted to the glide tester. The amplitude of the signal spike produced by glide head 8 is proportional to the energy transferred to glide head 8 when it contacts bump 4. Using the signal spike caused by bump 4, which has a known size, a fixed threshold level may be set.

Figure 2:
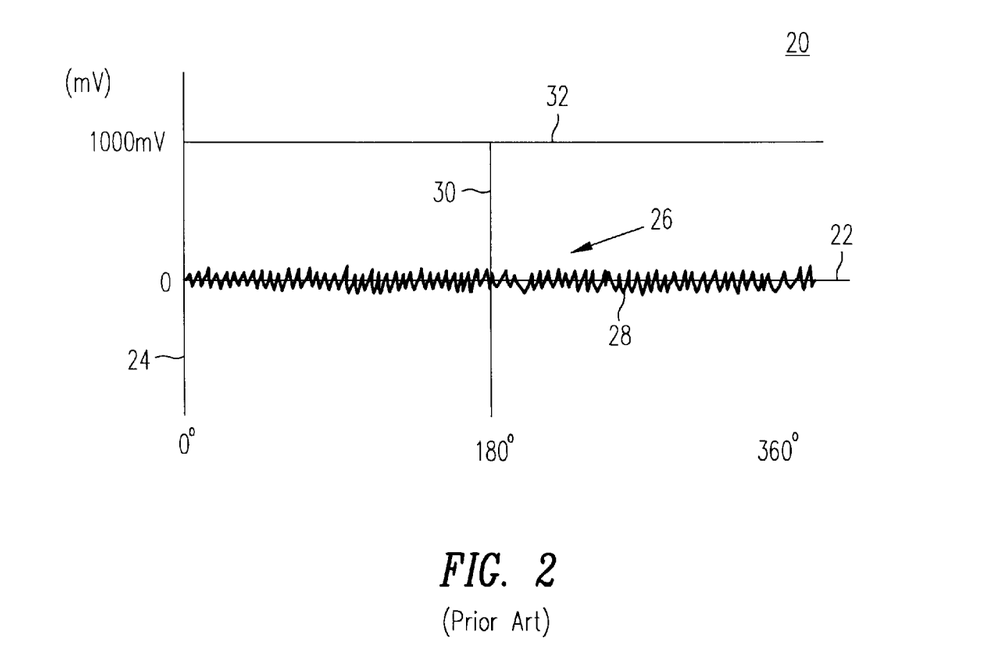
FIG. 2 is a graph illustrating the calibration of a glide head with a calibration bump disk, where the x-axis represents the angular position of the glide head over the bump disk and the y-axis represents the amplitude in millivolts of the output signal generated by the glide head.

FIG. 2 is a graph 20 illustrating the calibration of glide head 8. The angular position of glide head 8 over bump disk 2 is shown on the x-axis 22 and the amplitude of the output signal generated by glide head 8 is shown in millivolts (mV) on the y-axis 24. The output signal 26 comprises a noise signal 28 of approximately 100 mV, and a signal spike 30 of approximately 1000 mV. Noise signal 28 is created by the roughness of the surface of the disk, which affects the air bearing on which glide head 8 is flying. Signal spike 30 represents the contact between glide head 8 and bump 4 at the approximate angular position of 180° on bump disk 2. A fixed threshold level 32 is shown set at the peak of signal spike 30, at approximately 1000 mV. Typically, however, there are small fluctuations in the peak of signal spike 30 and, thus, setting the fixed threshold level at the peak of signal spike 30 is often dependent upon operator subjectivity.

As discussed above, another method of setting fixed threshold level 32 is by adjusting the gain used to amplify output signal 26 until the peak of signal spike 30 is set at the target threshold level.

Once calibrated, the glide tester may then be used to glide test a memory disk using the fixed threshold level. The fixed threshold level and the gain of the output signal remain constant during glide testing. During the glide test, the glide tester amplifies the output signal produced by the glide head and compares the output signal to the fixed threshold level. If the output signal exceeds the fixed threshold level a defect is identified. However, bump disks generally have large diameter bumps, e.g., approximately 50 to 200 $\mu$m wide, relative to defects found on the surface of a memory disk, e.g., as narrow as 1.0 $\mu$m wide. Because signal spikes are proportional to the energy transferred to the glide head during the head to disk contact, using a fixed threshold level based on a large diameter bump on a calibration bump disk may permit narrow, but high defects to pass during glide testing. In other words, the defect may contact the glide head, but because of the narrow width of the defect, the energy transfer will be minimal creating only a small amplitude signal spike, and the defect may go undetected.

A fixed threshold level requires that each testing sensor, including glide heads, optical scanners, and acoustic emissions sensors, be independently calibrated before being used to test memory disks. This pre-calibration process has associated costs, such as maintenance and service costs, as well as the loss of productivity. Further, calibration using bump disks may result in variations in the magnitude of the fixed threshold levels, because there are inherent variances in the testing mechanisms and in the calibration bump disks. For instance, one glide head may have a more sensitive transducer than another glide head or one bump disk may have bumps with slightly different sizes or shapes than found on other bump disks. There is also operator subjectivity involved in the setting of the fixed threshold level.

Another problem is that memory disks are often intentionally textured or roughened in the contact-start-stop (CSS) zone, while they are as smooth as possible in the data zone. On some memory disks there is a gradual transition in the roughness between these two zones. The fixed threshold level that is appropriate for the data zone may be too sensitive for the CSS zone. Accordingly, as the testing mechanism, such as the glide head, moves from one zone to another, the fixed threshold level must be adjusted at an arbitrary radius of the memory disk. This adjustment results in a test that is too sensitive on one side of the arbitrary radius and too insensitive on the other side. Thus, because there is a gradual change in the surface roughness, accurate testing of the transition area is difficult with a testing mechanism that uses a fixed threshold level.

Another problem that occurs when calibrating a glide head or an acoustic emissions sensor with a bump disk is that the sensors lose sensitivity as they are used after the initial calibration. For instance, as a glide head is used its trailing edge wears out, which reduces the amplitude of the output signals because there is less contact area between the glide head and the defects. This wear similarly affects acoustic emissions sensors. The fixed threshold level set during calibration, however, does not have a corresponding decrease in magnitude. A signal spike that is initially greater than the fixed threshold level may fall below the fixed threshold level after continuous use of the head. Thus, a defective memory disk will be allowed to pass after sufficient sensitivity is lost due to head wear. Consequently, the testing sensor must be frequently recalibrated in order to reset the fixed threshold level. Despite frequent recalibrations, the testing sensor may, nevertheless, lose sensitivity between recalibrations. Further, the frequent recalibrations have associated service and maintenance costs as well as costs associated with a loss of productivity.

SUMMARY

A dynamic threshold margin in accordance with the present invention is used to test media, such as memory disks. The threshold margin, which is the difference between the threshold level and the noise signal, may be dynamically controlled in real time based on the output signal produced by the testing apparatus during the testing of the memory disk. Thus, the use of a dynamic threshold margin eliminates the need for calibration prior to testing the memory disk and eliminates error caused, for instance, by glide head output degradation or zone transitions on the memory disk.

The dynamic threshold margin is based on the output signal of the testing apparatus, such as a glide head, an optical scanner, or an acoustic emissions sensor. The output signal which comprises a noise signal and signal spikes, is converted to a direct current (DC) signal. The rate of change of the DC converted signal is controlled such that signal spikes are prevented from significantly affecting the DC converted signal. For a glide head, the DC converted signal is proportional to the general roughness of the surface of the disk. The dynamic threshold margin between the output signal and the threshold level may then be generated as a function of the DC converted signal.

The dynamic threshold margin may be generated as a dynamic threshold level, a dynamically amplified output signal, or both. In one embodiment, for instance, a dynamic threshold level is generated by amplifying the DC converted signal. In another embodiment, the DC converted signal is used to dynamically control the amplification gain of the output signal, thus generating a dynamically amplified output signal. In a third embodiment, both the dynamic threshold old level and the dynamically amplified output signal are used.

Because the dynamic threshold margin is generated as a function of the DC converted signal, which is based on the output signal produced by the testing sensor, the dynamic threshold margin will automatically adjust to any changes in the parameter that is being tested, such as the surface roughness of the memory disk. The dynamic threshold margin also changes automatically in response to any output signal degradation. Further, the use of a dynamic threshold margin permits the increase of the sensitivity of the memory disk test by electronically decreasing the threshold margin.

DETAILED DESCRIPTION

A method of testing memory storage media in accordance with the present invention uses a dynamic threshold margin between the noise signal produced by the testing apparatus and the threshold level. In one embodiment, the present invention is used to test finished memory storage media, and in another embodiment, a textured substrate of the memory storage media is tested. The dynamic threshold margin is controlled as a function of the noise signal. The dynamic threshold margin may be implemented by dynamically controlling the threshold level, dynamically controlling the amplification gain and/or offset of the output signal, or both. Although the present disclosure is directed to generating a dynamic threshold margin for use with a glide head to test a memory disk, it should be appreciated that the concepts of the present invention are applicable to any media testing system that compares an output signal from a testing sensor to a threshold level, including but not limited to an optical scanner and an acoustic emissions sensor. It should also be appreciated that the concepts of the present invention are applicable to any parameters being testing by the testing sensor, including but not limited to the roughness of the disk surface and the magnetic field near the surface of the disk.

Figure 3A:
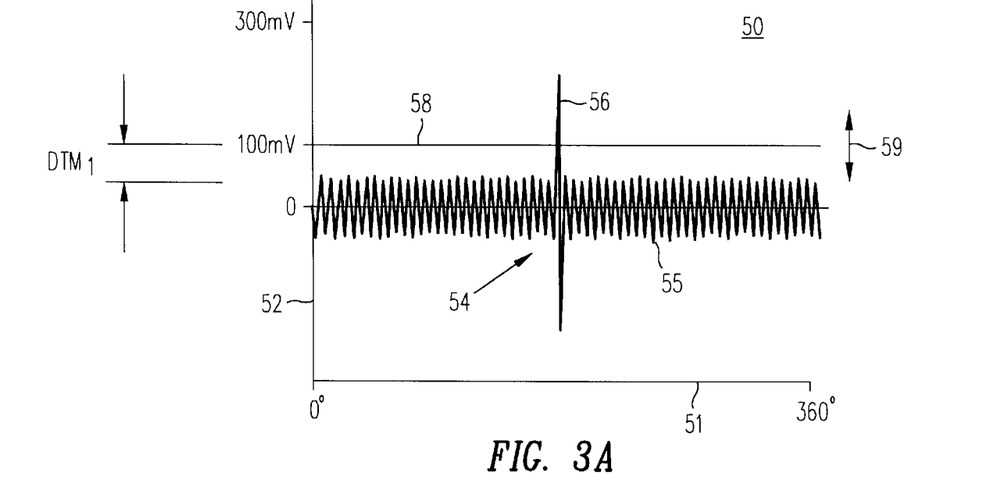
FIGS. 3A and 3B are graphs illustrating the use of a dynamic threshold margin in the form of a dynamic threshold level and in the form of a dynamically amplified output signal, respectively, in accordance with the present invention.
Figure 3B:
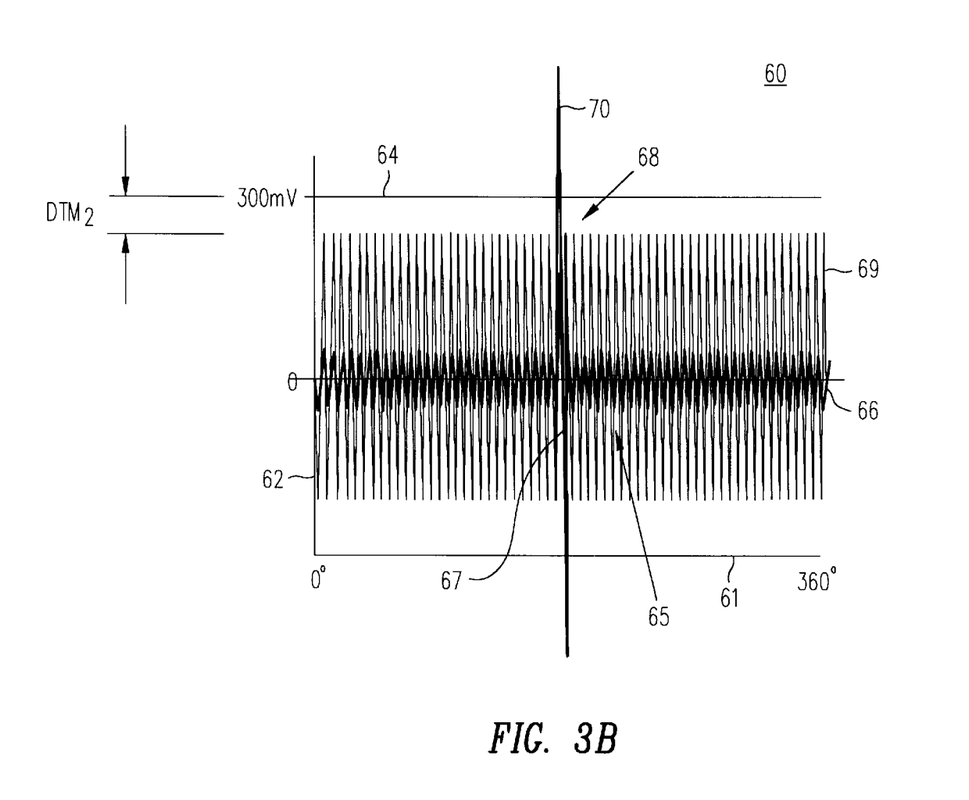

The use of a dynamic threshold margin is illustrated in graphs 50 and 60 shown in FIGS. 3A and 3B, respectively. The x-axes 51, 61 in graphs 50, 60, respectively, represent the angular position of the disk, while the y-axes 52, 62 represent the magnitude of the output signal of the testing sensor (such as a glide head) in millivolts. In both graphs 50 and 60, the output signals 54, 65 comprise noise signals 55, 66 with peaks at approximately 50 mV, and signal spikes 56, 67 with peaks at approximately 200 mV. Graph 50 illustrates an embodiment where the threshold level is dynamically adjusted as a function of the noise signal, while the gain used to amplify the output signal is held constant. Graph 60 illustrates a second embodiment where the gain used to amplify the output signal is dynamically adjusted as a function of the noise signal, while the threshold level is held constant. Of course, a third embodiment, which would be a combination of graphs 50 and 60, may be used where both the threshold level and the gain used to amplify the output signal are dynamically adjusted as functions of the noise signal.

Graph 50 shows a dynamic threshold level 58 of a type used in a first embodiment of the invention. Dynamic threshold 58 is set at 100 mV, creating a dynamic threshold margin $DTM_1$ of 50 mV. In accordance with the invention, dynamic threshold level 58 automatically changes as indicated by arrow 59 in response to changes in noise signal 55, such that dynamic threshold margin $DTM_1$ may be maintained at a desired value, e.g., 50 mV, or may increase or decrease in proportion to changes in noise signal 55. It can be seen in graph 50, that by decreasing dynamic threshold margin $DTM_1$, there is a greater sensitivity in the test being performed.

Graph 60 illustrates generating a dynamic threshold margin by dynamically controlling the amplification of the output signal from the glide head in accordance with a second embodiment of the invention. Graph 60 shows a threshold level 64 which is held constant at 300 mV and an output signal 65, which comprises the noise signal 66, with peaks at approximately 50 mV and a signal spike 67. Also shown in graph 60 is a dynamically amplified output signal 68, comprising an amplified noise signal 69 and an amplified signal spike 70. A dynamic threshold margin $DTM_2$ of approximately 50 mV is shown between threshold level 64 and amplified noise signal 69. The amplification gain of output signal 65 is automatically changed in response to changes in noise signal 66, similar to dynamic threshold level 58.

It is understood that both the dynamic threshold level and the dynamically amplified output signal may be used simultaneously. Such an embodiment may be seen in graph 60 where threshold level 64 is dynamically controlled in the same manner as dynamic threshold level 58 in graph 50.

Figure 4:
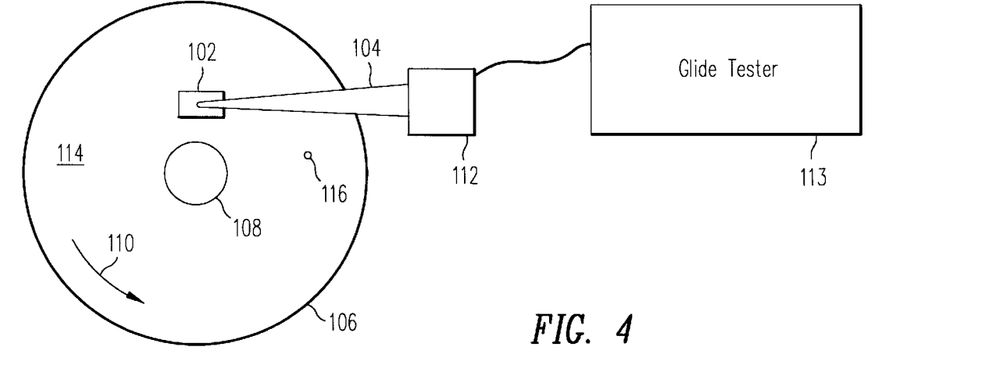
FIG. 4 illustrates a glide head attached to a suspension arm and actuator while glide testing a rotating memory disk to create a dynamic threshold margin in accordance with the present invention.

A dynamic threshold margin may be used in a glide test of a memory disk 106 using a glide head 102, as shown in FIG. 4. Glide head 102 is connected to a suspension arm 104 while flying over memory disk 106. Memory disk 106 is mounted on spindle 108, which is connected to a motor (not shown) that rotates memory disk 106 in the direction of arrow 110 at the appropriate rotational velocity to produce the desired fly height of glide head 102. Suspension arm 104 is connected to glide head 102 and an actuator 112, which may move glide head 102 across the surface 114 of memory disk 106. Actuator 112 may move glide head 102 from track to track across surface 114 or may move glide head 102 in a continues fashion so glide head spirals across surface 114. In either way, substantially the entire surface 114 of memory disk 106 is tested for defects.

During the glide test of memory disk 106, a transducer (not shown) mounted on glide head 102 produces an output signal comprising a noise signal and signal spikes. The noise signal results from the air bearing transferring the roughness of surface 114 to glide head 102. When surface 114 is rough, the air bearing vibrates glide head 102 producing a higher amplitude noise signal than if surface 114 is smooth. When glide head 102 physically contacts a defect 116 on surface 114, the output signal is then in the form of a signal spike. The output signal from glide head 102 is transmitted to glide tester 113. Glide tester 113 compares the output signal to a threshold level, where the margin between the noise signal and the threshold level is dynamically controlled.

Figure 5:
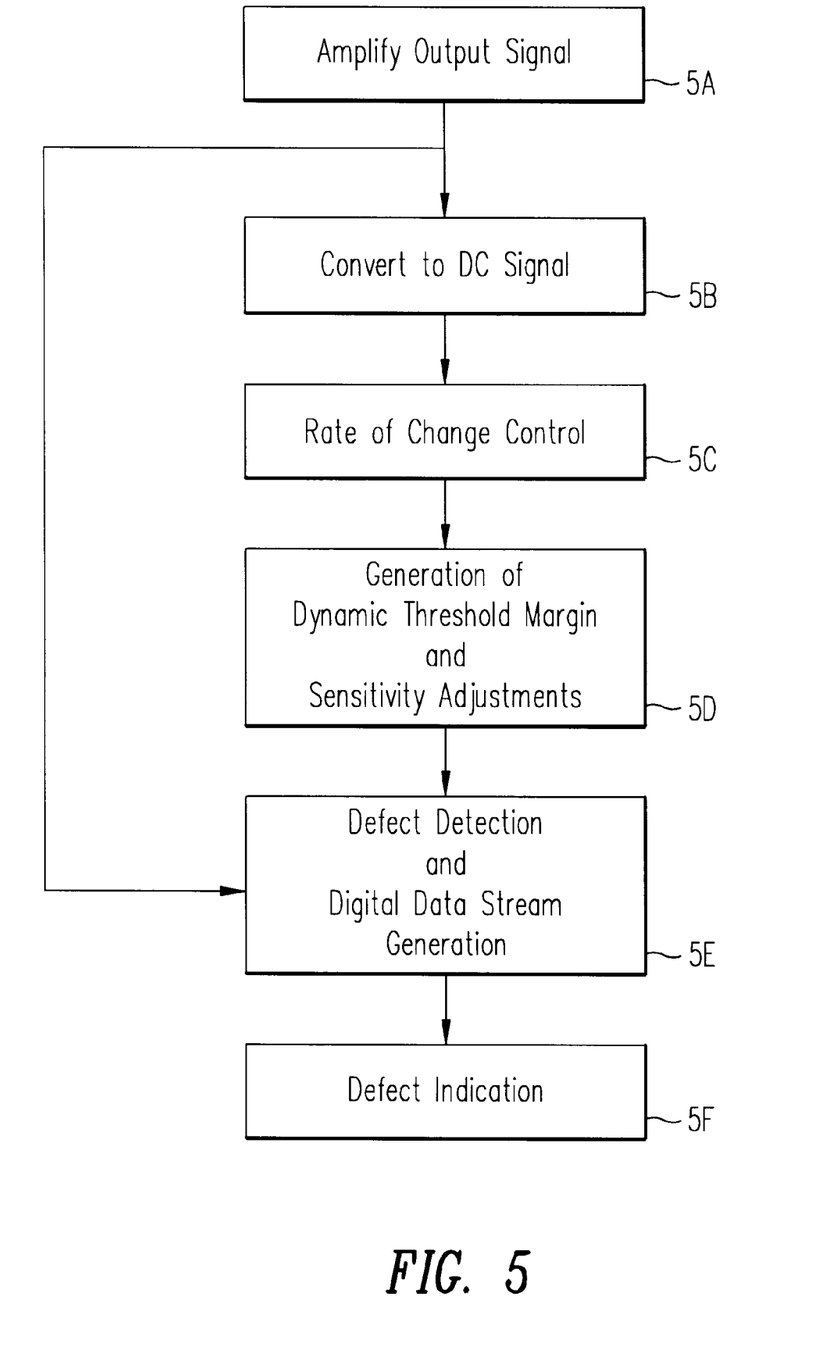
FIG. 5 is a flow chart of the process of generating a dynamic threshold margin and using the dynamic threshold margin to detect defects on a memory disk, in accordance with the present invention.

FIG. 5 is a flow chart describing the process of generating and using a dynamic threshold margin from the output signal produced by glide head 102 in FIG. 4. A similar process may be used for other testing sensors. As shown in block 5A, first the output signal from glide head 102 is amplified. This may be accomplished by a conventional glide tester 113, which amplifies the output signal prior to processing, or by feeding the output signal through a conventional amplifying circuit.

The amplified output signal is then converted to a DC voltage signal as described in block 5B. The DC voltage signal may be produced by any means that produces a signal that is indicative of or proportional to the noise signal. By way of example, but not limitation, the DC conversion may be accomplished by rectifying and low pass filtering the amplified output signal; by taking the root mean square of the amplified output signal; or by peak following the amplified output signal. The method of converting the amplified output signal to a DC converted signal is not critical as long as the DC converted signal is representative of the noise signal or noise signal power. For glide head 102, the DC converted signal is a representation of the general roughness of surface 114. Of course, if a testing sensor other than a glide head is being used, the DC converted signal should be proportional to the noise signal generated by whatever parameter is being tested.

Block 5C describes controlling the rate of change of the DC converted signal. Controlling the rate of change ensures that the DC converted signal will be essentially unaffected by any signal spikes that are produced, such as when glide head 102 contacts defect 116 on surface 114. Consequently, the DC converted signal will be a function of the noise signal and will remain essentially unaffected by signal spikes. In one embodiment, the rate of change of the DC converted signal may be controlled with a low pass filter having a response slow enough to keep the DC converted signal stable during signal spikes or any momentary noise level changes. For example, the rate of change of the DC converted signal may be set using a 10 Hz (Hertz) low pass filter. By lowering or raising the frequency of the low pass filter, the rate of change of the DC converted signal may be increased or decreased.

As shown in block 5D, the dynamic threshold margin is generated and the sensitivity of the dynamic threshold margin is adjusted. The dynamic threshold margin is a function of the DC converted signal. Because the DC converted signal is the basis for generating the dynamic threshold margin, the dynamic threshold margin automatically adjusts to any changes in surface roughness of the disk or loss of sensitivity of glide head 102. Because the rate of change of the DC converted signal is controlled, a signal spike will not significantly affect the dynamic threshold margin. The dynamic threshold margin may automatically adjust to changes in surface roughness of the disk or loss of sensitivity of glide head 102 in a continous fashion or through discrete changes, for instance, where as the disk is digitally sampled.

In one embodiment the dynamic threshold margin is a dynamic threshold level generated by amplifying the DC converted signal with gain and offset adjustments. Such an embodiment is described below in reference to FIG. 10. The use of gain and offset adjustments permits electronic control of the sensitivity of the dynamic threshold level and, therefore, the test being conducted.

Figure 6:
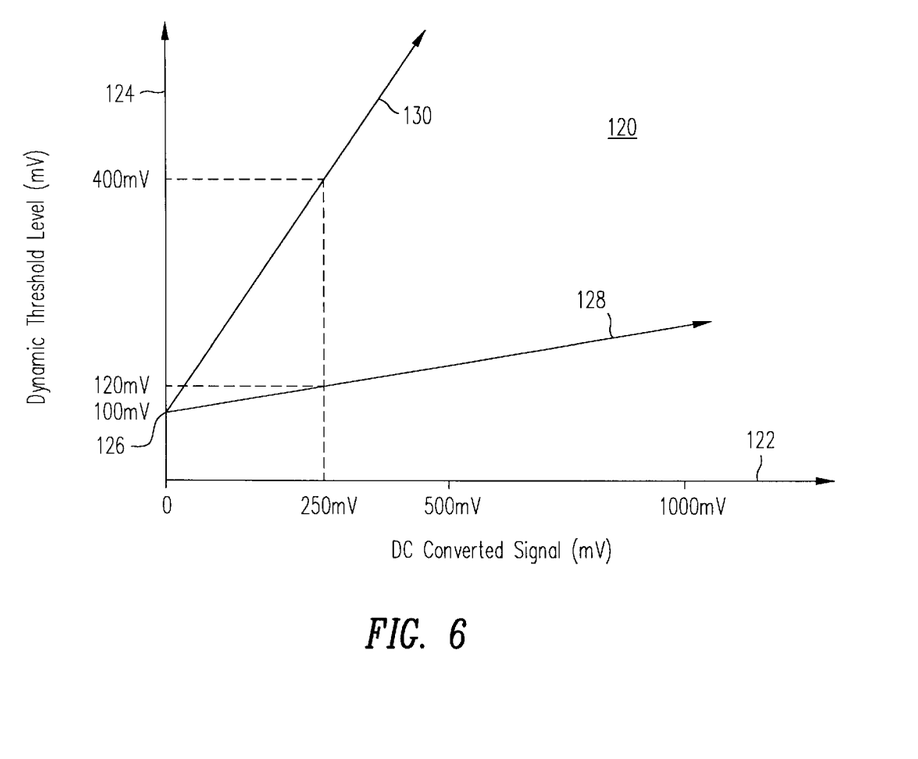
FIG. 6 is a graph illustrating the control over the sensitivity of the dynamic threshold level using gain and offset adjustments.

Referring to FIG. 6, there is shown a graph 120 illustrating the control over the sensitivity of a dynamic threshold level using offset and gain adjustments. The x-axis 122 represents the value of the DC converted signal in millivolts and the y-axis 124 represents the value of the dynamic threshold level also in millivolts. The offset adjustment is used to set the minimum value for the dynamic threshold level. If the desired minimum value for the dynamic threshold level is 100 mV, for example, an offset is set at 126 on the y-axis. Of course, the offset may be adjusted to any desired value. The gain adjustment is used to control the amount that the DC converted signal is amplified in order to produce the dynamic threshold level. The gain of the dynamic threshold level is represented in graph 120 by the slope of a line extending from the y-axis 124. Thus, line 128, which has a small slope, represents a small gain. If the DC converted signal is 250 mV on x-axis 122, a dynamic threshold level with a 100 mV offset and a gain represented by line 128 will have a value of 120 mV. It can be seen that line 130 represents a much larger gain than line 128, because line 130 has a greater slope. Thus, with the same DC converted signal of 250 mV on x-axis 122, a dynamic threshold level with a gain represented by line 130 will have a value of 400 mV.

Another embodiment of the dynamic threshold margin uses a dynamically amplified output signal, where the threshold level is held constant and the amplification gain of the output signal is dynamically controlled. In other words, the gain is a function of the DC converted signal. The sensitivity of the dynamically amplified output signal can also be controlled using gain and/or offset adjustments. A specific embodiment using a dynamically amplified output signal is shown in reference to FIG. 9 below. It is appreciated that a third embodiment using both the dynamic threshold level and the dynamically amplified output signal may be produced by combining the circuits shown in FIGS. 9 and 10. Moreover, it is understood that the dynamic threshold margin may be be implemented through hardware or software, in which the gain factor and offset adjustments are programmable.

As shown in block 5E of FIG. 5, defects may then be detected using the dynamic threshold level and/or the dynamically amplified output signal from block 5D. The amplified output signal from block 5A is transmitted to a defect detection circuit, which compares the amplified output signal to the threshold level from block 5D, where the margin between the threshold and the amplified output signal is dynamically controlled. A defect is considered to be at any point that the amplified output signal exceeds the threshold level. A conventional comparator circuit, or other similar device, may be used as the defect detection circuit. The defect detection circuit then generates a digital data stream indicating whether or not a defect was found, as shown in block 5E.

The digital data stream in block 5E may then be transmitted to a circuit used to indicate whether or not a defect was found, as shown in block 5F. For instance, a defect indicator circuit may map the location of any defects encountered by glide head 102, as is done in conventional glide testers.

Figure 7A:
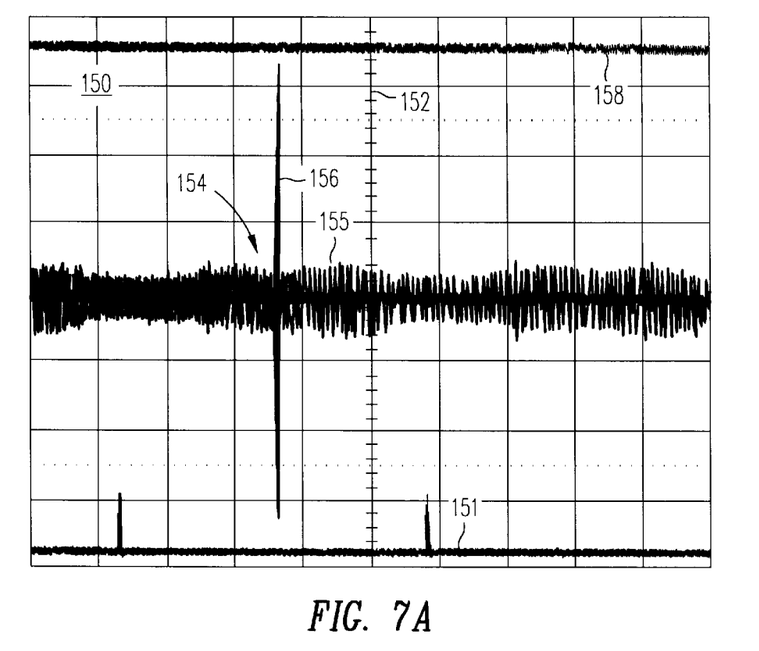
FIGS. 7A and 7B are graphs of a glide test using a dynamic threshold level where the output signal has a high amplitude noise signal and a small amplitude noise signal, respectively.
Figure 7B:
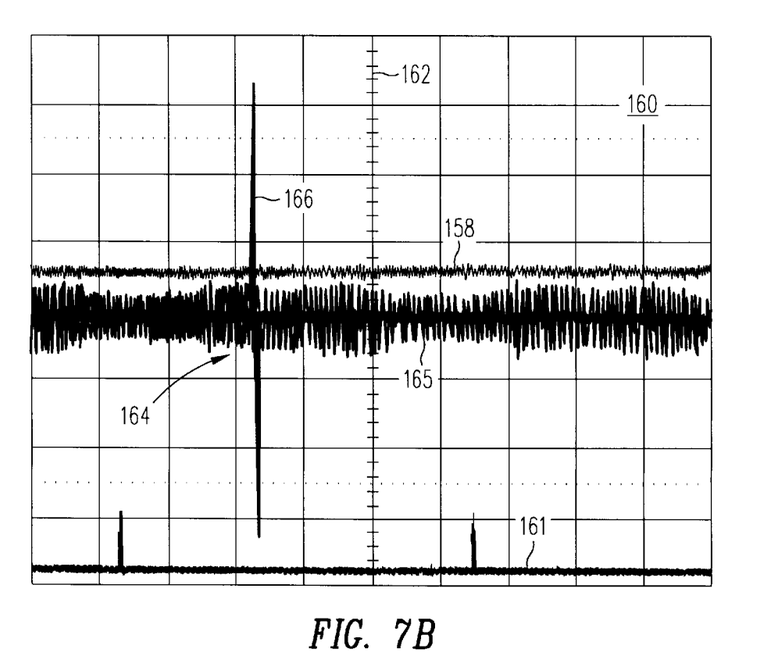

FIGS. 7A and 7B are graphs 150 and 160, respectively, of glide tests of a memory disk using a dynamic threshold level where the angular position of the memory disk is shown on the x-axes 151, 161 and the amplitude of the output signal is shown as 200 mV per square on the y-axes 152, 162. Graph 150, in FIG. 7A, represents a portion of the CSS zone of a memory disk, with an output signal 154 having a noise signal 155 with peaks at approximately 80 mV and a signal spike 156 with an amplitude of approximately 650 mV. The dynamic threshold level 158, which has an offset of 10 mV and a gain of 10, is shown at 700 mV. Signal spike 156 is not considered a defect in graph 150 because it does not exceed dynamic threshold level 158.

Graph 160, in FIG. 7B, represents a portion of the data zone of the same memory disk, where the output signal 164 now has a relatively low amplitude noise signal 165 of approximately 40 mV and a signal spike 166 with the same amplitude as signal spike 156, approximately 650 mV. Because noise signal 165 in graph 160 has a lower amplitude than noise signal 155 in graph 150, dynamic threshold level 158 is lowered to 120 mV. Consequently, in graph 160, signal spike 166 is considered a defect because it exceeds dynamic threshold level 158.

Figure 8A:
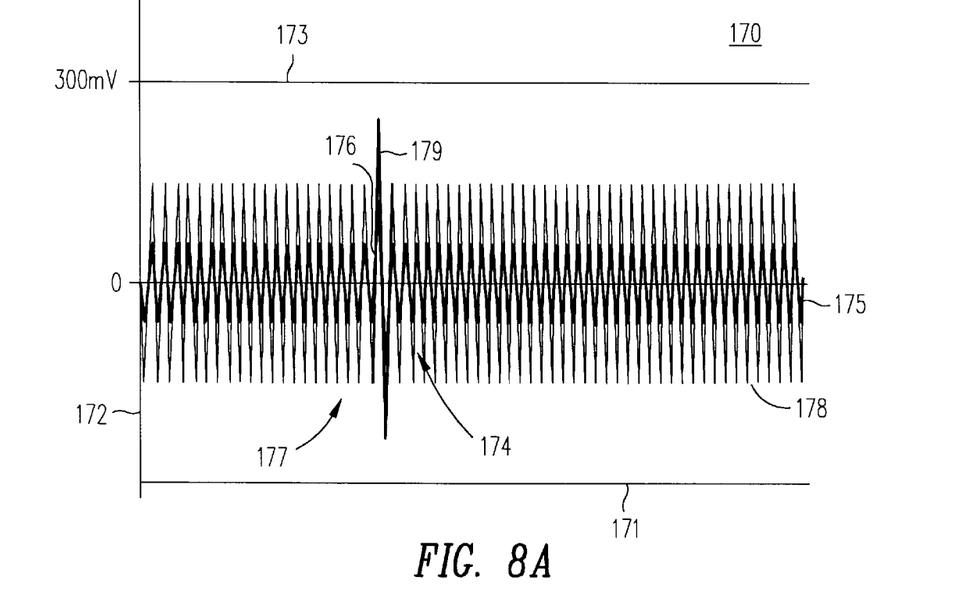
FIGS. 8A and 8B are graphs of a glide test using a dynamically amplified output signal where the output signal has a high amplitude noise signal and a small amplitude noise signal, respectively.
Figure 8B:
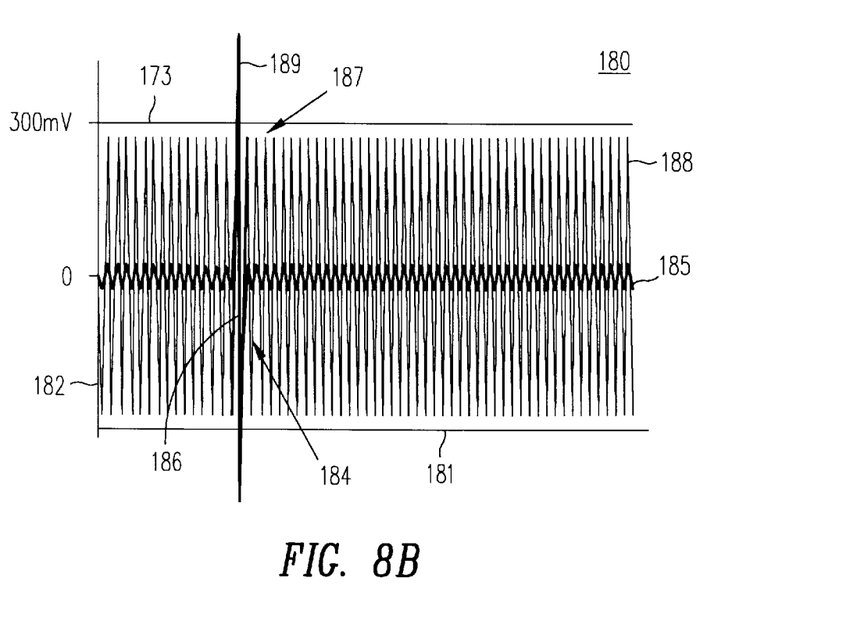

FIGS. 8A and 8B are graphs 170, 180, respectively, of a glide test of a memory disk using a dynamically amplified output signal where the angular positions of the memory disk are shown on the x-axes 171, 181, and the amplitude of the output signal is shown in millivolts on the y-axes 172, 182. Graph 170 represents a glide test of a portion of the CSS zone of a memory disk with a threshold level 173 set at 300 mV. Graph 170 also shows an output signal 174 that has a noise signal 175 with peaks at approximately 50 mV, and a signal spike 176 of approximately 100 mV. A dynamically amplified output signal 177 is also shown, with an amplified noise signal 178 having peaks at approximately 150 mV and an amplified signal spike 179 with a peak at approximately 200 mV. Dynamically amplified output signal 177 is dynamically controlled relative to the DC converted signal from output signal 175.

Graph 180, in FIG. 8B, represents a glide test of a portion of the data zone of the same memory disk using the same threshold level 173 found in graph 170. Graph 180 shows a relatively small output signal 184 comprising a noise signal 185 and a signal spike 186. Also shown in graph 180 is dynamically amplified output signal 187 comprising amplified noise signal 188 and amplified signal spike 189. Because noise level 185 is low, the amplification of output signal 187 is increased, thereby reducing the dynamic threshold margin between the peaks of amplified noise signal 188 and threshold level 173.

One benefit of using a dynamic threshold margin is that it permits the sensitivity of the test to be electronically increased by minimizing the difference between the threshold level and the noise signal. As shown in the graph 50 in FIG. 3, the sensitivity of the test using dynamic threshold level 58 may be increased by reducing the dynamic threshold margin $DTM_1$, which can be done, for instance, by decreasing the offset adjustment or increasing the gain controlling the dynamic threshold level 58.

Another benefit of the dynamic threshold margin is that it automatically compensates for any changes in surface roughness of the memory disk or changes in the sensitivity of the testing sensor because the dynamic threshold margin is based on a DC conversion of the output signal. As a result, the dynamic threshold margin automatically compensates for gradual changes in surface roughness found between the data zone and the CSS zone. Further, because the dynamic threshold margin is based in real time on the noise signal, there is no need to pre-calibrate with a bump disk or to perform frequent recalibrations. Consequently, variances in test results that are caused by variances in the bump disks used for calibration or operator subjectivity in setting the threshold level can be avoided. Thus, using a dynamic threshold margin improves the consistency of the performance of the testing sensors. Further, because the need for pre-calibration and frequent recalibrations is eliminated, the dynamic threshold margin also eliminates associated costs, such as the costs of service, maintenance, and loss of productivity.

Figure 9:
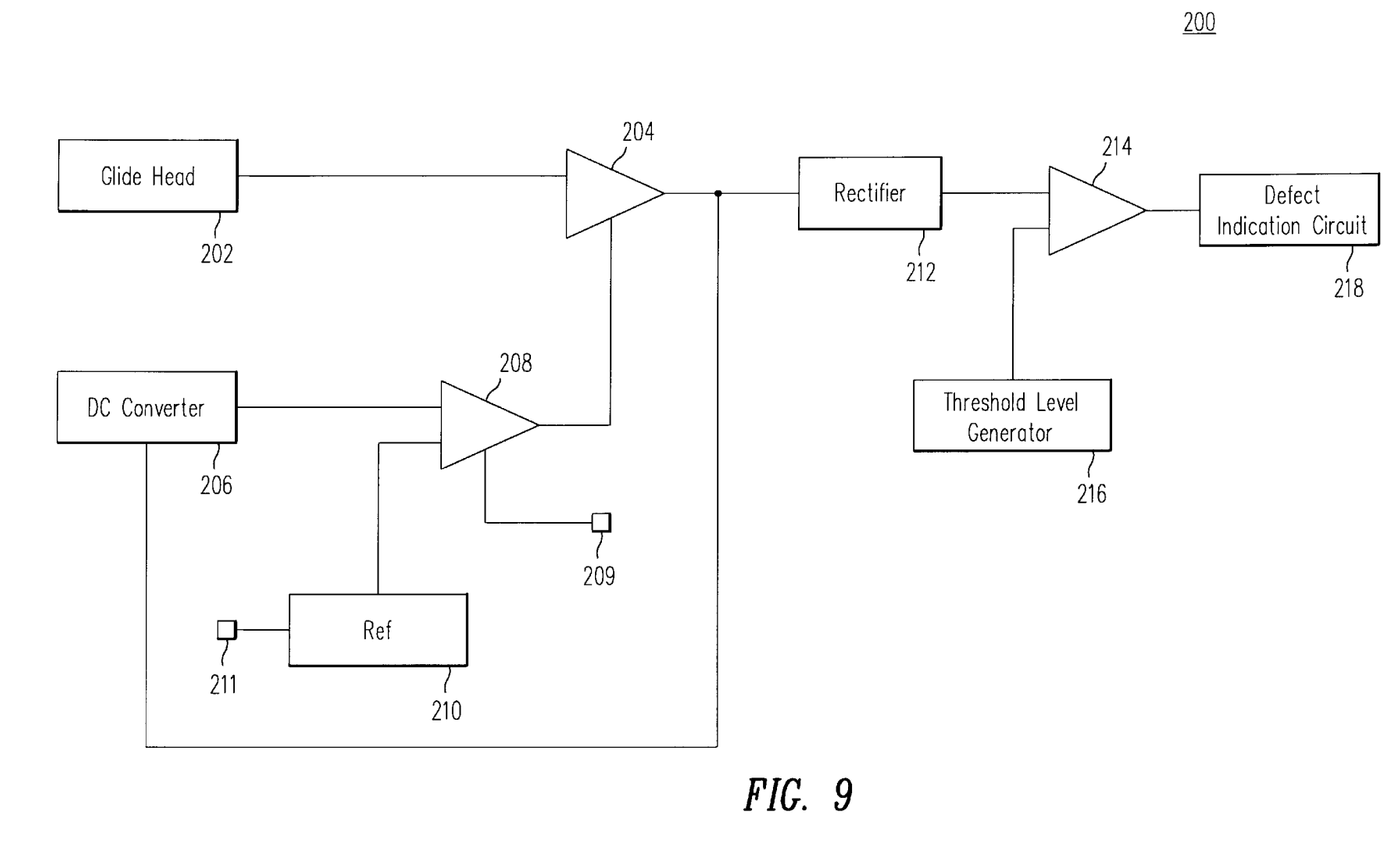
FIG. 9 is an embodiment of a circuit that produces a dynamically amplified output signal to be compared with a threshold level, in accordance with the present invention.

An embodiment of a dynamically amplified output signal used in comparison with a threshold level is shown as circuit 200 in FIG. 9. Glide head 202 produces an output signal which is transmitted to an amplifier 204, which amplifies the output signal. The output terminal of amplifier 204 is coupled to a DC converter 206, which converts the amplified output signal from amplifier 204 into a DC converted signal. The DC converted signal is then fed into a differential amplifier 208 along with a reference signal from a reference voltage source 210. The signal generated by differential amplifier 208 is used to dynamically control the gain and/or offset of amplifier 204. The signal generated by differential amplifier 208 may be controlled using gain adjustment 209 attached to differential amplifier 208 or offset adjustment 211 attached to reference voltage source 210. Thus, amplifier 204 produces a dynamically amplified output signal. The output terminal of amplifier 204 is also coupled to a rectifier circuit 212, where the dynamically amplified output signal is rectified. A comparator 214 is coupled to rectifier circuit 212 and a threshold level generator 216. Comparator 214 compares the dynamically amplified output signal from amplifier 204 and the threshold level signal from threshold level generator 216, and produces the appropriate logic signal indicating whether or not the dynamically amplified output signal exceeds the threshold level. The logic signal may then be fed to a defect indication circuit 218, which is used to map or otherwise indicate if a defect was detected by comparator 214.

Figure 11:
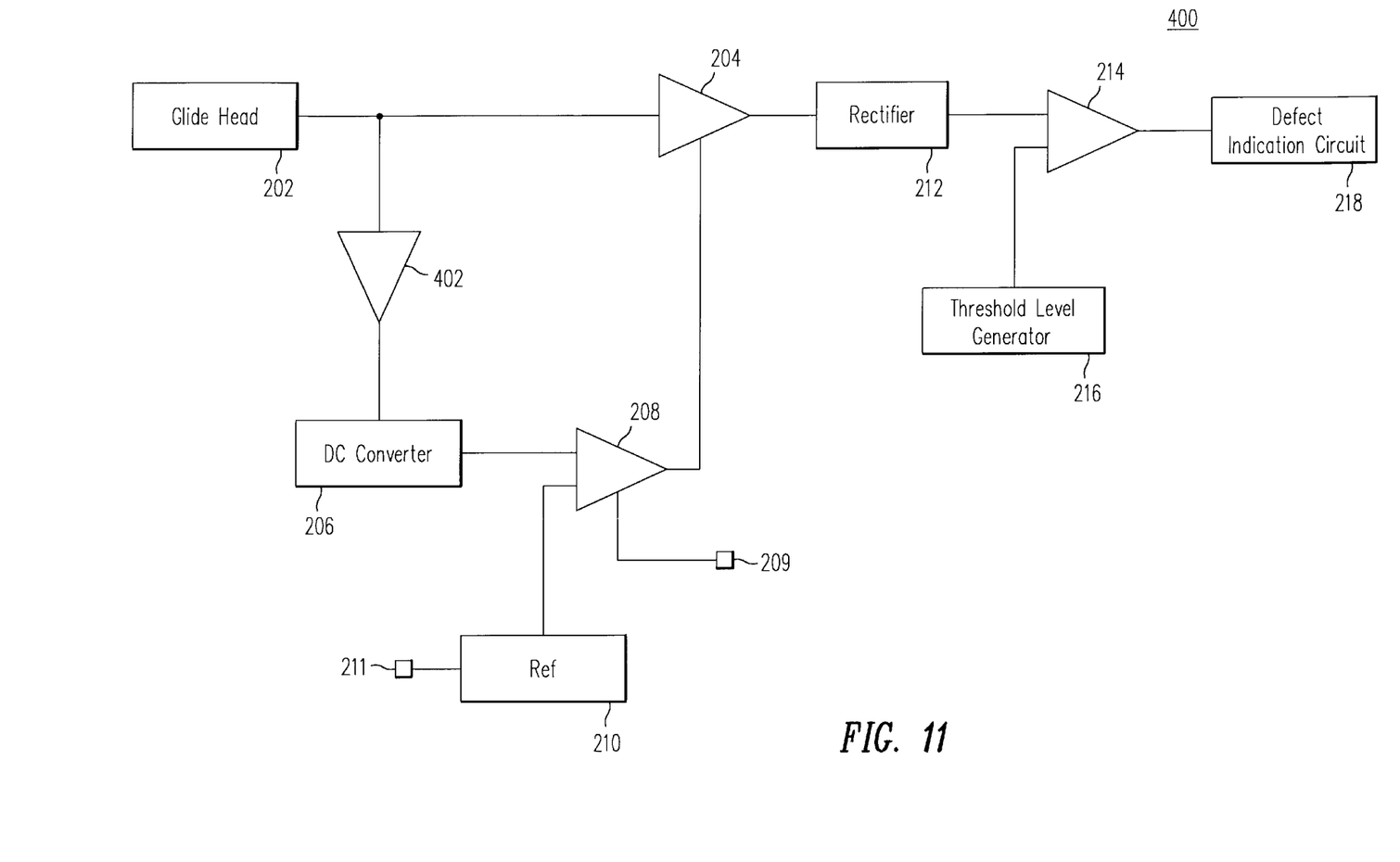
FIG. 11 is another embodiment of a circuit that produces a dynamically amplified output signal to be compared with a threshold level, in accordance with the present invention.

FIG. 11 shows a circuit 400, which is similar to circuit 200 in FIG. 9, like designated elements being the same. However, circuit 400 includes a second amplifier 402 disposed between glide head 202 and DC converter 206. Thus, DC converter 206 receives the amplified output signal from second amplifier 402. The DC converted signal is then fed into differential amplifier 208, which produces a signal to dynamically control amplifier 204.

Figures 10, 10C:
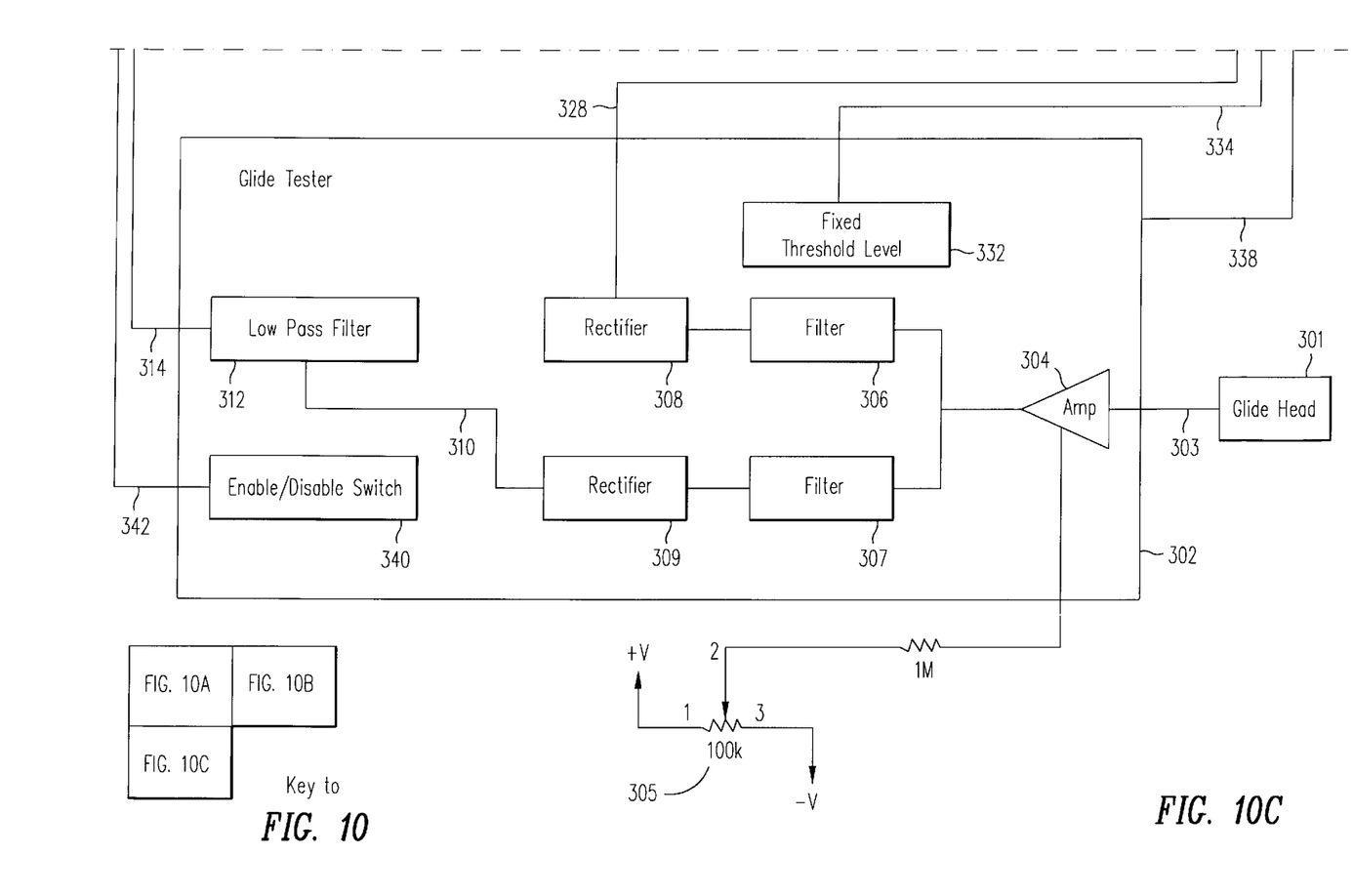
FIG. 10 is an embodiment of a circuit that produces a dynamic threshold level and compares the dynamic threshold level with the output signal generated by a glide head, in accordance with the present invention.
Figure 10A:
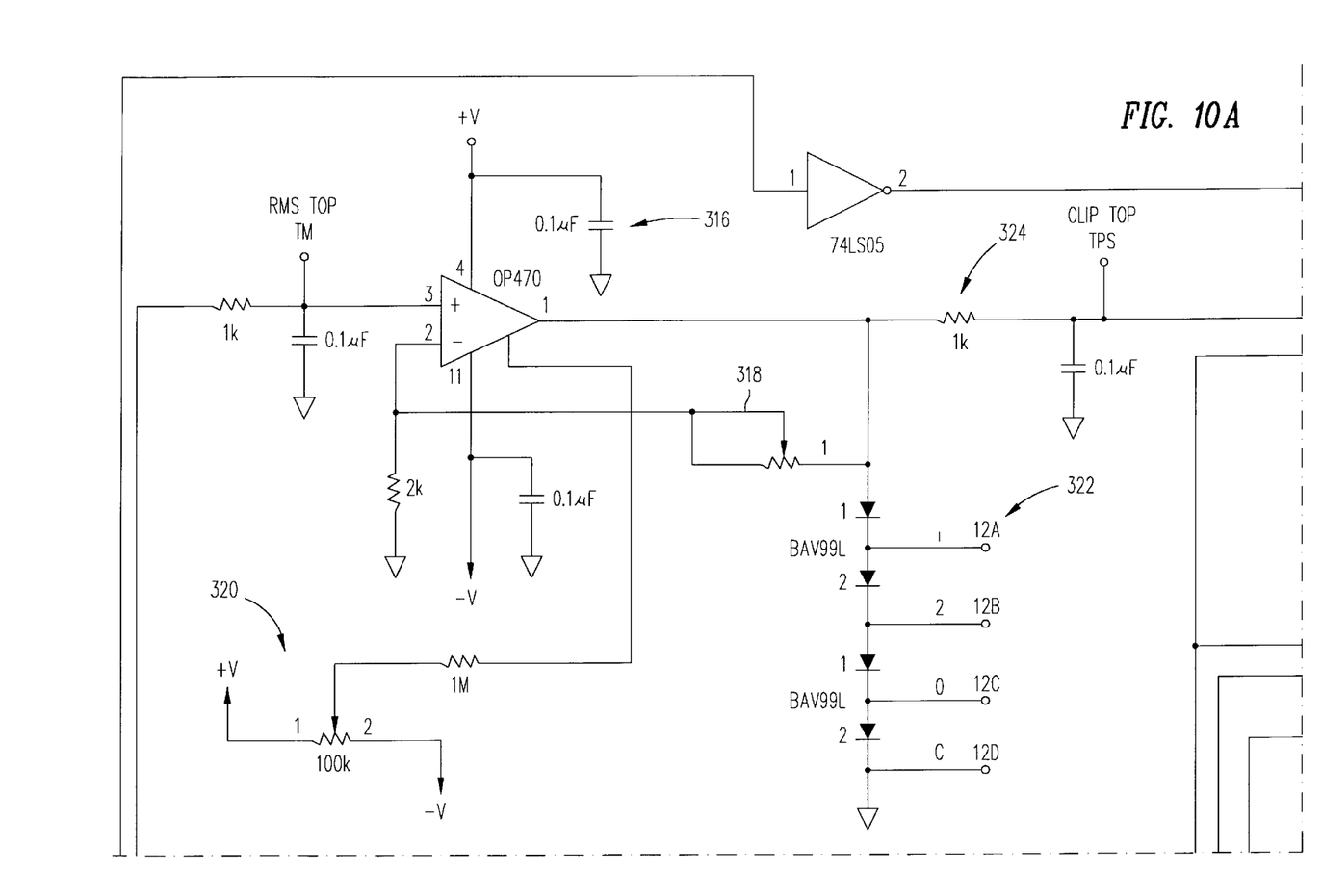
Figure 10B:
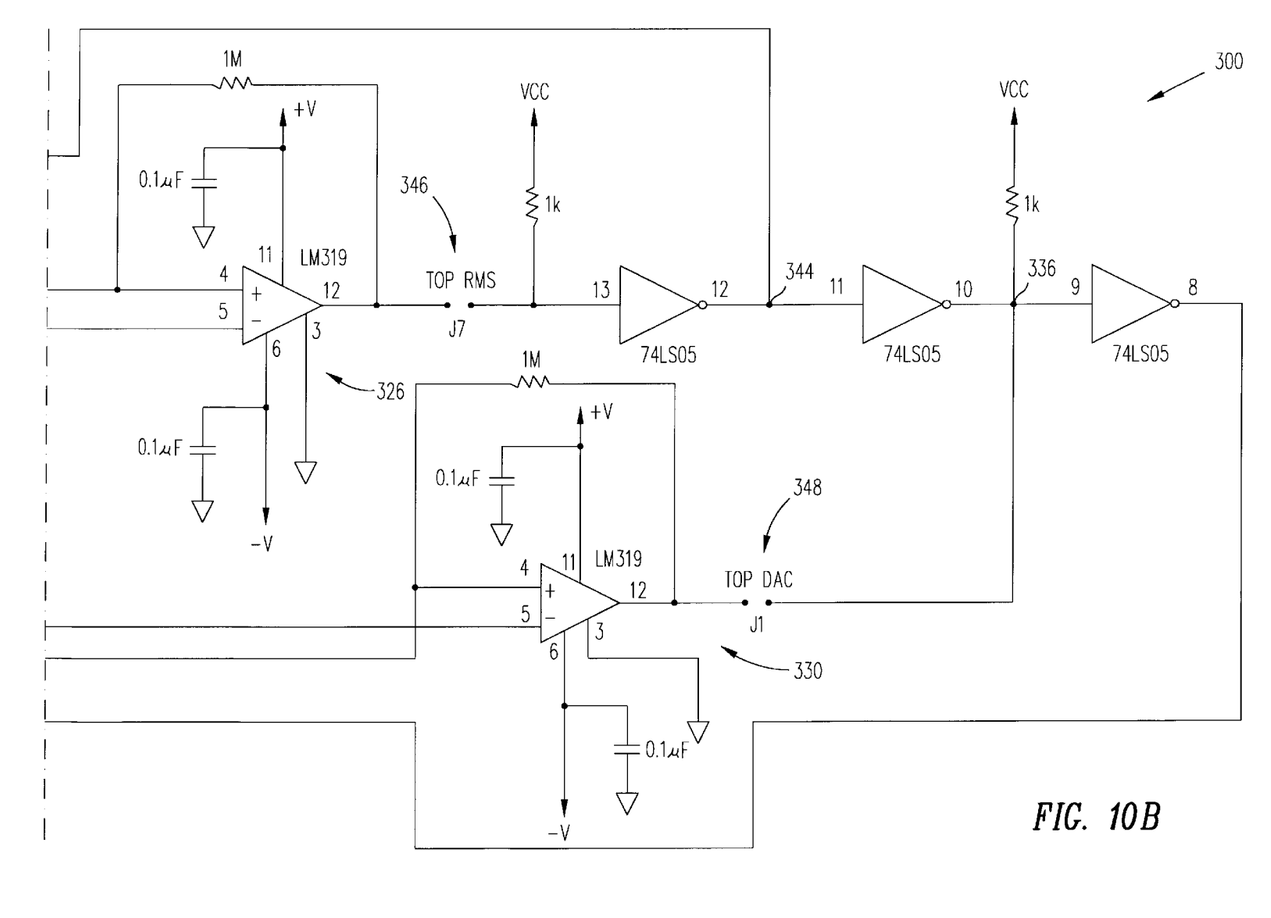

An embodiment that generates a dynamic threshold level and compares the output signal produced by a glide head with the dynamic threshold level is shown as a schematic diagram of circuit 300 in FIG. 10. The output signal produced by the glide head shown as block 301 enters glide tester 302 via lead 303. Glide tester 302 may be a standard glide tester, such as model MG 100, MG 150, MG 250 or MG 250A, manufactured by Phase Metrics, Inc., located in Fremont, Calif. Although a similar circuit for an optical scanner or acoustic emissions sensor may be used to test memory disks using a dynamic threshold level, circuit 300 will be described with reference to a glide tester for the sake of clarity.

The internal circuitry of glide tester 302 is standard, and therefore will only be described generally. The output signal on lead 303 is amplified by an amplifier illustrated as block 304 located in the internal circuitry of glide tester 302. The amplifier 304 may be modified with an offset adjustment 305 to eliminate any DC amplifier offset. The amplified output signal is fed to an output signal filter 306, which is used to select the component frequency of the output signal that will be compared with the dynamic threshold level. Output signal filter 306 may pass, for example, high frequency signals caused by contact between the glide head and a defect, which are typically in the range of 200 KHz to 1 MHz. The amplified output signal is also transmitted to a second output signal filter 307, which is used to select the component frequency of the output signal that will be used to generate the dynamic threshold level. This second output signal filter 307 may pass, for example, the low frequency signals caused by vibrations of the glide head as it rides on the air bearing, which are typically in the range of 1 KHz to 100 KHz.

Output signal filters 306 and 307 are connected to standard rectification circuits, 308 and 309, respectively, which rectify the amplified output signal. In another embodiment, however, only one output signal filter and one rectification circuit are used. Rectification circuit 309 is connected to a low pass filter 312 by a lead 310. Low pass filter 312 is also a standard circuit that may be found within conventional glide testers and is generally used to produce a voltage that is proportional to the average roughness of the surface of the disk. The combination of rectification circuit 309 and low pass filter 312 converts the amplified output signal from amplifier 304 into a DC voltage produced on lead 314. Low pass filter 312 additionally controls the rate of change of the DC converted signal, such that signal spikes or momentary noise level changes on the output signal have little affect on the DC converted signal on lead 314.

The DC converted signal is transmitted via lead 314 to a standard amplifier 316. A conventional amplifier, such as model OP470, manufactured by PMI, located in Santa Clara, Calif., will suffice for this purpose. Amplifier 316 amplifies the DC converted signal to generate the dynamic threshold level. Amplifier 316 has a gain adjustment 318 and an offset adjustments 320, which are used to adjust the sensitivity of the dynamic threshold level. As described above, the magnitude of the dynamic threshold level may be controlled using gain adjustment 318, while the minimum value of the dynamic threshold level may be set with offset adjustment 320.

A system of clipping diodes 322 is located at the output terminal of amplifier 316. Clipping diodes 322 place a limit on the maximum magnitude of the dynamic threshold level. If the DC converted signal produced on lead 314 is too high, indicating excessive disk roughness, head crash, or contamination, clipping diodes 322 limit the increase in the dynamic threshold level so that these defects may be detected.

The dynamic threshold level signal is then passed through a low pass filter 324, which limits any extraneous electrical noise. The dynamic threshold level is then fed into a comparator 326. A conventional comparator will suffice, such as a model LM319, produced by National Semiconductor, Inc. located in Santa Clara, Calif. The rectified, amplified output signal from rectification circuit 308, is transmitted via lead 328 to comparator 326. Thus, comparator 326 receives at one terminal the dynamic threshold level and at another terminal the rectified, amplified output signal from rectification circuit 308. Comparator 326 compares the signals and generates an appropriate logic signal at the output terminal of comparator 326, indicating whether or not the rectified, amplified output signal exceeds the dynamic threshold level.

Circuit 300 also includes a second comparator 330. Comparator 330 compares the rectified, amplified output signal on lead 328 with a fixed threshold level stored in glide tester 302 at block 332. The fixed threshold level is generated in the conventional manner prior to testing a memory disk. The fixed threshold level is transmitted to comparator 330 by lead 334. Thus, circuit 300 uses both a dynamic threshold level and the fixed threshold level. An appropriate logic signal is produced at the output terminal of comparator 330, indicating whether or not the rectified, amplified output signal exceeds the fixed threshold level. The logic signal from dynamic threshold level comparator 326 is then combined with the logic signal from fixed threshold level comparator 330 at node 336, such that if either comparator finds a defect the combined logic signals at node 336 will indicate a defect. The combined logic signals are then fed back into glide tester 302 through lead 338. Glide tester 302 then indicates if a defect was found by either comparator 326 or comparator 330 and maps the location of defects on the memory disk in a conventional manner.

Because the dynamic threshold level is generally more sensitive than the fixed threshold level, comparator 330 is not necessary and may be bypassed or eliminated if desired. Consequently, the logic signal generated by dynamic threshold level comparator 326 may be fed directly into glide tester 302, completely eliminating the use of a fixed threshold level.

Additionally, a dynamic threshold level enable/disable switch 340 may be used to turn on or off the dynamic threshold level function. The signal generated by switch 340 is transmitted via lead 342 and is combined with the logic signal produced by comparator 326 at node 344. When it is desirable to disable the dynamic threshold level function, such as when testing disks that are not specified with dynamic threshold levels, switch 340 produces a signal that when combined with the logic signal from comparator 326 will always indicate that there are no defects. Additionally, hardware jumper switches 346, 348 may be used to bypass the dynamic threshold level, the fixed threshold level, or both.

Although specific embodiments have been described and illustrated in order to explain the present invention, the present invention is not limited thereto. Additional circuit components can be added to achieve additional functions, such as using multiple channels to test the top surface of the disk simultaneously with the bottom surface of the disk, or using a fixed threshold level in conjunction with the dynamic threshold margin. In addition, circuit components may be added to buffer, filter, amplify or otherwise modify the sensor signal, independently of the DC conversion circuit, prior to being compared to the threshold level. The present invention comprehends any form of substrate testing which uses a threshold level, including but not limited to glide testing, optical scanning, and acoustic emissions sensing. Moreover, the present invention may be implemented through hardware or using software where gain factor and offset are programmable. Further, the dynamic threshold margin may be changed in a continous fashion or in discrete levels as the disk is sampled. Accordingly, various adaptations, modifications and combinations of the features of the specific embodiments can be practiced without departing from the scope of the invention.

What is claimed is:

1. A method for generating a dynamic threshold margin for testing a disk, said method comprising:
   producing a sensor signal while testing a disk, said sensor signal being indicative of a parameter being tested, said sensor signal comprising a noise signal;
   converting said sensor signal to a DC signal;
   generating a dynamic threshold margin as a function of said DC signal, said dynamic threshold margin being the difference between a threshold level and said noise signal, wherein said dynamic threshold margin changes in relation to changes in said DC signal; and
   comparing said threshold level to said sensor signal.

2. The method of claim 1, wherein said sensor signal is produced by a glide head.

3. The method of claim 1, wherein said noise signal represents the surface roughness of said disk.

4. The method of claim 1, wherein said DC signal is proportional to said noise signal.

5. The method of claim 1, further comprising controlling the rate of change of said DC signal.

6. The method of claim 1, wherein said converting said sensor signal to a DC signal comprises low pass filtering said sensor signal.

7. The method of claim 1, wherein said dynamic threshold margin continuously changes in relation to changes in said DC signal.

8. The method of claim 1, wherein said generating a dynamic threshold margin as a function of said DC signal comprises amplifying said DC signal to produce said threshold level.

9. The method of claim 8, wherein said amplifying said DC signal comprises adjusting at least one of the offset and the gain of the amplification.

10. The method of claim 1, further comprising amplifying said sensor signal prior to said step of converting said sensor signal to a DC signal, and wherein said step of comparing said threshold level to said sensor signal comprises comparing the amplified sensor signal to said threshold level.

11. The method of claim 1, further comprising dynamically amplifying said sensor signal, and wherein said generating a dynamic threshold margin as a function of said DC signal further comprises using said DC signal to control said dynamically amplifying said sensor signal.

12. The method of claim 11, wherein said using said DC signal to control said dynamically amplifying said sensor signal comprises controlling at least one of the gain and the offset of the amplification.

13. An apparatus for testing a disk, said apparatus comprising:
   a sensor positioned to test a disk, said sensor producing a sensor signal, wherein said sensor signal comprises a noise signal;
   a converting circuit coupled to said sensor, said converting circuit converting said sensor signal to a DC signal;
   a threshold generating circuit coupled to said converting circuit, said threshold generating circuit generating a dynamic threshold level, wherein the difference between said dynamic threshold level and said noise signal changes as a function of said DC signal; and
   a comparison circuit coupled to said sensor and said threshold generating circuit, said comparison circuit comparing said dynamic threshold level to said sensor signal.

14. The apparatus of claim 13, further comprising an amplifying circuit disposed between said sensor and said converting circuit and between said sensor and said comparison circuit, said amplifying circuit amplifying said sensor signal, and wherein said converting circuit converts said amplified sensor signal to said DC signal, and wherein said comparison circuit compares said dynamic threshold level to said amplified sensor signal.

15. The apparatus of claim 13, wherein said converting circuit comprises a low pass filter circuit disposed between said sensor and said threshold generating circuit.

16. The apparatus of claim 13, wherein the difference between said dynamic threshold level and said noise signal changes as a continuous function of said DC signal.

17. The apparatus of claim 13, wherein said threshold generating circuit is an amplifying circuit, said amplifying circuit amplifying said DC signal.

18. The apparatus of claim 17, further comprising at least one of a gain control circuit and an offset control circuit coupled to said amplifying circuit.

19. An apparatus for testing a disk, said apparatus comprising:
   a sensor positioned to test a disk, said sensor producing a sensor signal, wherein said sensor signal comprises a noise signal;
   a first amplifying circuit coupled to said sensor, said first amplifying circuit dynamically amplifying said sensor signal;
   a converting circuit coupled to said sensor, said converting circuit converting said sensor signal to a DC signal;
   an amplification control circuit coupled to said converting circuit and said first amplifying circuit, said amplification control circuit controlling the dynamic amplification of said sensor signal as a function of said DC signal;
   a comparison circuit coupled to said first amplifying circuit; and
   a threshold providing circuit coupled to said comparison circuit, said threshold providing circuit providing a threshold level, wherein said comparison circuit compares said threshold level to the dynamically amplified sensor signal.

20. The apparatus of claim 19, wherein said first amplifying circuit is disposed between said sensor and said converting circuit, wherein said converting circuit converts the dynamically amplified sensor signal to a DC signal.

21. The apparatus of claim 19, further comprising a second amplifying circuit disposed between said sensor and said converting circuit, said second amplifying circuit amplifying said sensor signal, wherein said converting circuit converts the amplified sensor signal to a DC signal.

22. The apparatus of claim 19, wherein said converting circuit comprises a low pass filter circuit disposed between said sensor and said amplification control circuit.

23. The apparatus of claim 19, wherein said amplification control circuit controls the dynamic amplification of said sensor signal as a continuous function of said DC signal.

24. The apparatus of claim 19, wherein said amplification control circuit comprises:
   a third amplifying circuit disposed between said converting circuit and said first amplifying circuit; and
   a reference signal source coupled to said third amplifying circuit.

25. The apparatus of claim 24, further comprising at least one of a gain control circuit coupled to said third amplifying circuit and an offset control circuit coupled to said reference signal source.

* * * * *